350-374 SR

3/9/82 OR 4,318,581

United States Patent [19]
Guest et al.

[11] 4,318,581
[45] Mar. 9, 1982

[54] OPTICAL HOLOGRAPHIC CONTENT-ADDRESSABLE MEMORY SYSTEM FOR TRUTH TABLE LOOK-UP PROCESSING

[75] Inventors: Clark C. Guest; Thomas K. Gaylord, both of Atlanta, Ga.

[73] Assignee: Georgia Tech Research Institute, Atlanta, Ga.

[21] Appl. No.: 149,540

[22] Filed: May 13, 1980

[51] Int. Cl.³ .............................. G06F 7/56; G02B 5/32
[52] U.S. Cl. ..................................... 350/3.74; 364/713
[58] Field of Search ................... 350/3.64, 3.73, 3.74, 350/3.77, 3.82, 3.83, 3.84, DIG. 1; 364/713; 365/215, 216, 125

[56] References Cited

U.S. PATENT DOCUMENTS

| | | | |
|---|---|---|---|
| 3,466,433 | 9/1969 | Duda et al. | 364/713 |
| 3,614,191 | 10/1971 | Sakaguchi | 350/3.5 |
| 3,680,080 | 7/1972 | Maure | 364/713 |
| 4,138,189 | 2/1979 | Huignard et al. | 350/3.64 |

OTHER PUBLICATIONS

Collins, S. A., Jr. et al., "Optical Logic Gates Using a Hughes Liquid Crystal Light Valve", SPIE vol. 232, 1980, International Optical Computing Conference.
Orlov, L. A., et al., "Possibility of Construction of an Arithmetic Unit Based on Controlled Optical Transparencies", Sov. J. Quant. Electron, vol. 4, No. 1, (Jul. 1974).

Primary Examiner—John K. Corbin
Assistant Examiner—Bruce Y. Arnold
Attorney, Agent, or Firm—Newton, Hopkins & Ormsby

[57] ABSTRACT

A numerical optical processor which utilizes a holographic content-addressable memory is disclosed. The holographic memory stores relationships between various inputs and system outputs in the form of a plurality of truth tables in a digital format. One or more digital input words are processed by the numerical optical processor to produce digital outputs wherein the input words are modified by the contents of the holographic memory.

Two configurations of the numerical optical processor are disclosed. The first system is based on an EXCLUSIVE OR operation performed holographically on binary arrays. The second system performs an operation which is equivalent to two levels of logic: a NAND and OR followed by another OR operation. Various specific embodiments of the two configurations are disclosed.

21 Claims, 25 Drawing Figures

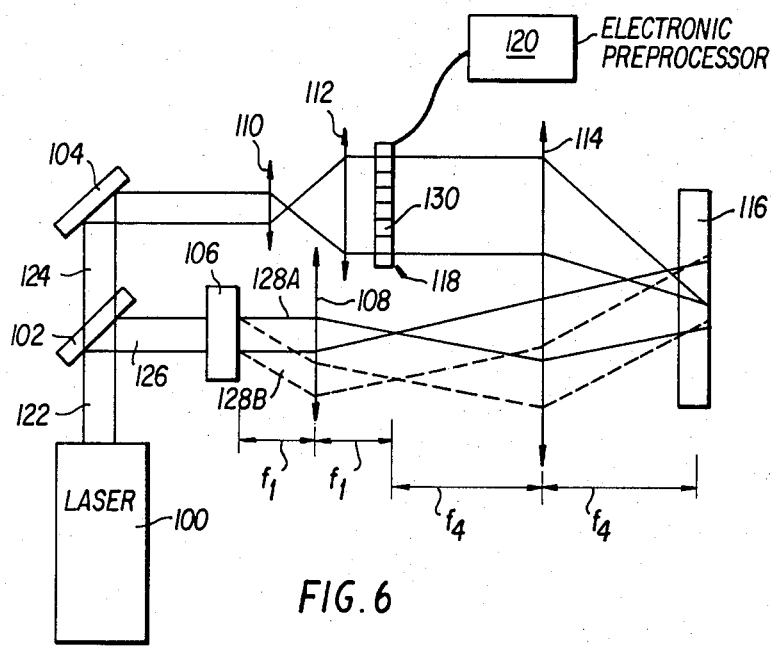
FIG. 6
FIG. 7A

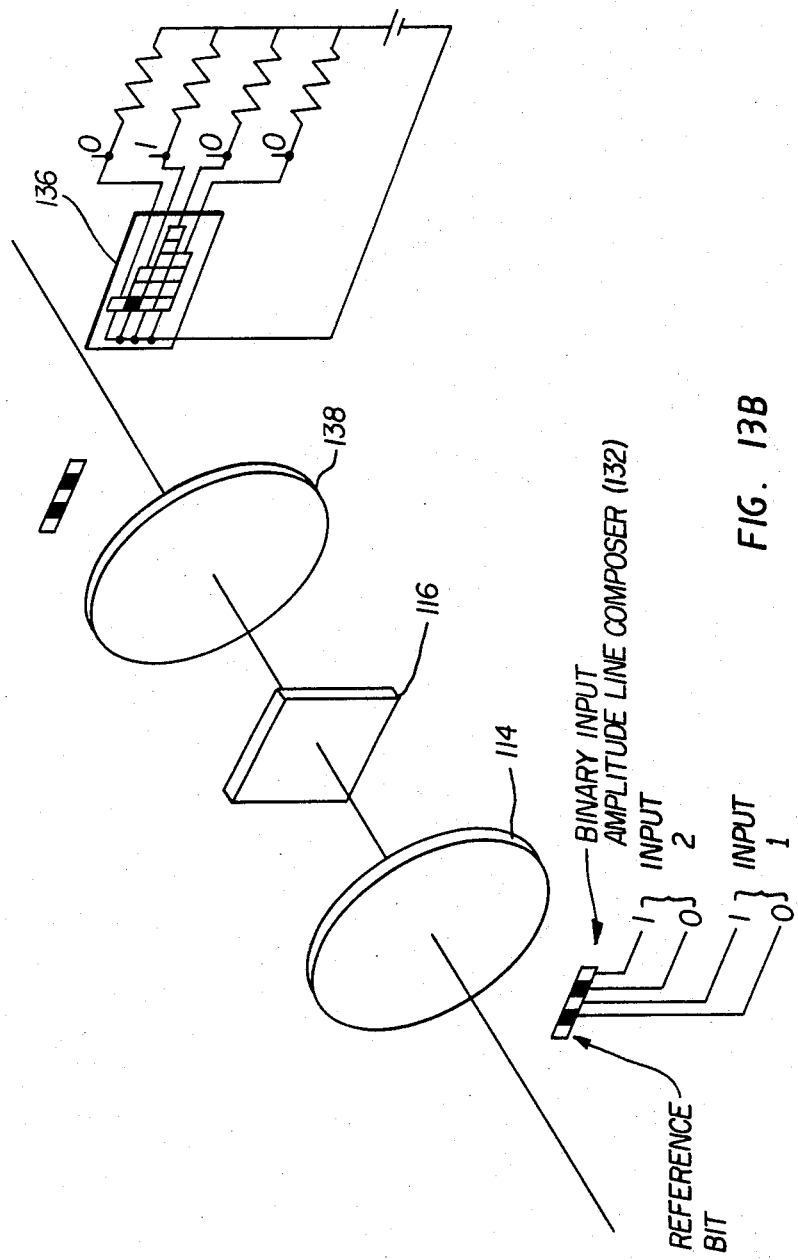

OPTICAL HOLOGRAPHIC CONTENT-ADDRESSABLE MEMORY SYSTEM FOR TRUTH TABLE LOOK-UP PROCESSING

The Government has rights in this invention pursuant to Contract No. DAAG29-78-C-0005 awarded by the U.S. Army Research Office, and Grant No. ENG-76-81707, awarded by the National Science Foundation.

BACKGROUND OF THE INVENTION

1. Field of the Invention

The present invention relates in general to a novel numerical optical processer system which utilizes a holographic content-addressable memory. The holographic memory stores relationships between various inputs and system outputs in the form of a plurality of truth tables in a digital format. One or more digital input words are processed by the disclosed numerical optical processing system to produce digital outputs wherein the one or more digital input words are modified by the contents of the holographic memory.

2. Description of the Prior Art

There is a growing class of processing problems which require the very high system throughputs that only parallel processing can provide. Such problems include remote sensing, automatic inspection, air traffic control, defense early-warning systems, automatic surveillance, meteorology, and coordinate position locating. Electronic digital techniques have demonstrated the required accuracy, speed, and flexibility to solve an enormous variety of processing problems. However, attempts to extend these techniques to parallel processing have proven to be very expensive and have introduced reliability problems. Because of the inherently parallel nature of optical processing systems, they are well suited for these problems. Optical processing systems of the past have been primarily analog in nature and have therefore sacrificed some of the accuracy and flexibility that digital techniques can provide. There have been, therefore, continuing efforts to combine optical techniques and digital numerical methods to obtain the benefits of both.

Previous optical data processing systems fall into two categories: Those that perform rudimentary logic operations on inputs and those that perform a specific numerical operation, or at best a limited range of operations, on the inputs. Many of these systems require unusual or awkward forms of input and output signals. The present invention is capable of implementing any combinational logic function or binary numerical operation which can be represented by means of a truth table. Inputs and outputs to the system are in the form of convenient binary-value electrical signals.

In a binary processing system, a truth table defines the relationship between the inputs and the output. The output values are tabulated for all possible combinations of the input values. Any combinational logic function or numerical operation can be represented by such a truth table. Among the numerical operations possible are: addition, subtraction, multiplication, division, trigonometric functions, exponentiation, and general polynomial functions of one or more variables. In a truth table look-up processer, each bit in the output answer is determined by comparing the input words with all combinations in the truth table which cause the particular output bit to be a logical "1". In operation, these systems compare the given input data pattern to the stored patterns associated with each output bit in the answer. Output bits corresponding to tables in which a matching pattern is found are set to a logical "1". If no match is found within a table, the associated output bit is set to logical "0".

Few numerical processing systems have been constructed using truth table look-up methods because of the large memory capacity required to store a table of reference patterns for each output bit. The large holographic storage capacity of thick recording materials such as electro-optic crystals can provide the necessary memory size. Electro-optic crystals possess the dynamic range necessary to record the large number of phase holograms required, as well as the stability to maintain the needed precise phase relationships of the reconstructed wavefronts. The thickness of electro-optic crystals permit the angular multiplexing of holograms which is necessary in some circumstances.

Designs for optical holographic location-addressable memories and for some forms of optical holographic content-addressable type memories are not suitable for truth table look-up processing of the type disclosed by the present application. Prior art optical holographic content-addressable memories are of the wavefront auto-correlation and cross-correlation type. These memories suffer from output light intensities which are essentially analog in nature and must therefore be threshold detected to produce a binary output. The present invention includes forms of optical holographic content-addressable memories which are not of the correlation type and thus produce outputs that are essentially discrete in nature, thereby lending themselves to parallel digital processers of the type described herein.

SUMMARY OF THE INVENTION

Accordingly, one object of the present invention is to provide a new and useful optical numerical processor based on a truth table look-up method wherein the truth table information stored in one or more holograms is utilized to perform logic operations on one or more digital input words.

It is a further object of this invention to provide a numerical optical processor system wherein any numerical operation, which can be represented by a truth table, may be performed in a highly parallel fashion on one or more digital input words.

Still another object of the present invention is to reduce the required maximum memory capacity for the truth table implementation by storing only those portions of the truth table information which produce a given logic level at the various bit positions of the system output.

Yet still another object of this invention is to provide an optical holographic content-addressable memory which produces outputs that are essentially discrete in nature.

Briefly, these and other objectives will be readily achieved in accordance with the present invention wherein an optical numerical processor system includes a holographic storage medium which stores at least one hologram representing relationships between a plurality of inputs and outputs in the form of binary truth tables. An input means is provided for receiving at least one digital input word and for coding an object beam with the input word. The coded object beam is further coded by passing it through the holographic storage medium. The coded object beam is received by detector means which converts the coded light signals into at least one output word in digital form. The system is further implemented by a first method wherein an EXCLUSIVE OR operation is performed holographically between the inputs and the stored truth table data. A second method of implementation includes an operation which is equivalent to holographically performing a NAND and an OR operation on input bits in patterns which are determined by the stored truth table data followed by a second OR operation on these results.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 shows an optical system used for recording holographic patterns utilized by a second preferred embodiment of the subject invention;

FIG. 7a and FIG. 7b illustrate two arrangements of truth table information utilized during recording by the optical system of FIG. 6;

FIGS. 13a and 13b are schematic illustrations of recording and processing under the second preferred embodiment respectively;

FIG. 14b illustrates the processing of input data with the holograms recorded in FIG. 14a;

FIG. 15b illustrates the processing of several inputs with multiple reconstructions of the holograms recorded in FIG. 15a.

DESCRIPTION OF THE PREFERRED EMBODIMENTS

Figure 1:
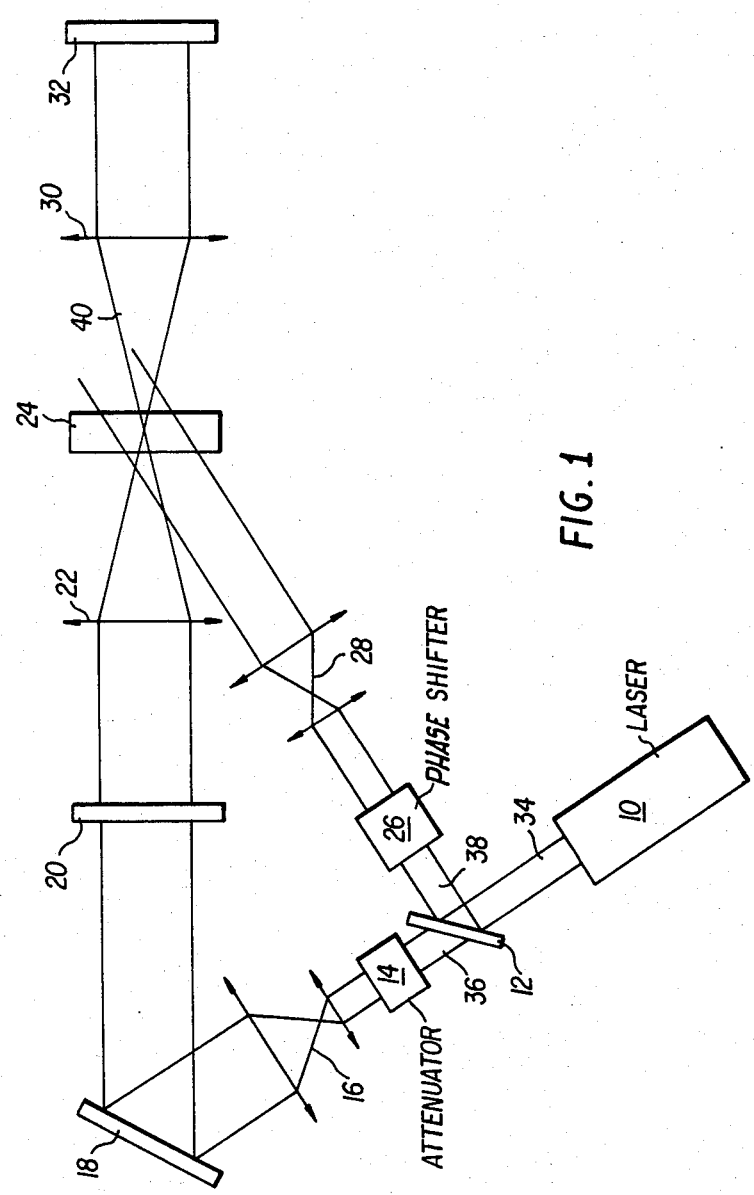
FIG. 1 shows an optical system illustrating a first preferred embodiment of the subject invention.

Referring now to the drawings, wherein like reference numerals designate identical or corresponding parts through the several views, and more particularly to FIG. 1 thereof, an optical system of a first preferred embodiment is illustrated. This first preferred embodiment implements the optical numerical processer by means of an optical form of a Boolean logic EXCLUSIVE OR operation.

In the system of FIG. 1, a beam of coherent light 34 is generated by a laser 10 and is divided into an object beam 36 and a reference beam 38 by means of a beam splitter 12. The reference beam 3 is passed through a phase shifter 26 and a collimator 28 and is thereafter incident upon the surface of a holographic recording medium 24. The holographic recorded medium may take the form of an electro-optic crystal such as iron-doped lithium niobate or any other suitable essentially transparent phase recording medium. In electro-optic crystals, electrons from dopant atoms are photoexcited in bright regions of the two-beam interference pattern. These electrons migrate under the influence of diffusion, drift, and bulk photovoltaic effect and form electric field patterns in the crystal which cause the index of refraction to change via the electro-optic effect. Thus a hologram is formed. The object beam 36, after passing through an attenuator 14 and a collimator 16, is directed upon the surface of a mirror 18 which reflects the beam through a page composer 20 and a Fourier transforming lens 22 and thereafter onto the surface of the holographic recording medium 24. Output light rays 40, passing through the recording medium, are imaged by a Fourier transforming lens 30 and directed upon the surface of a detector array 32. The system illustrated in FIG. 1 is utilized both for recording the truth table information on the holographic recording medium 24 and for processing input signals through the optical processor system. The method of recording the truth table information on the recording medium will be described first.

Figure 2:
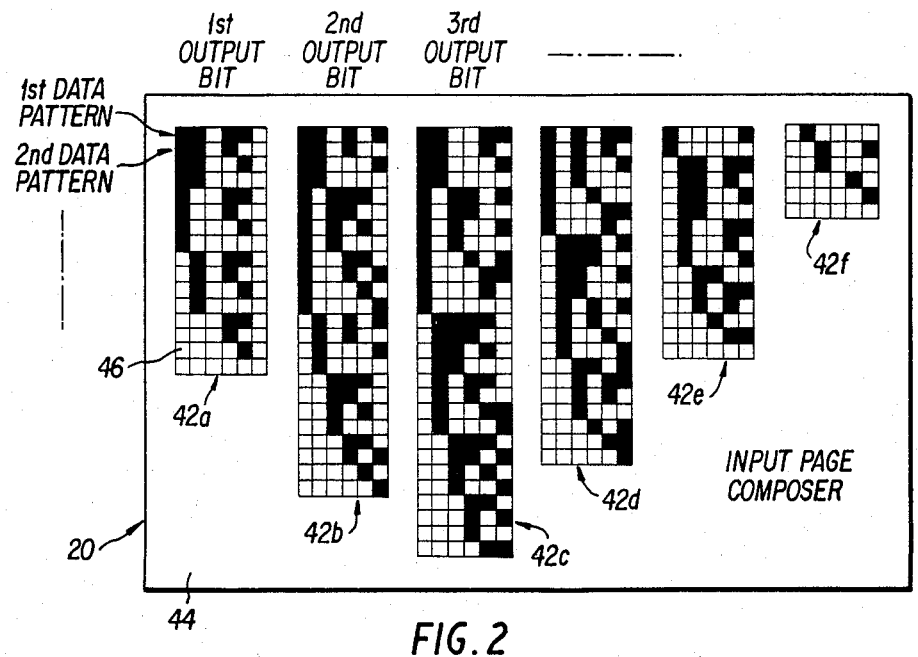
FIG. 2 shows the organization of data patterns to be recorded in the page composer shown in FIG. 1.

FIG. 2 illustrates a typical page composer 20 which is utilized during both recording and processing. The page composer 20 acts to spatially amplitude modulate the object beam 36 with the information contained in the truth tables as discussed below. The page composer 20 includes a plurality of two dimensional arrays 42a through 42f which are surrounded by an opaque material 44. Each array is associated with one bit of the output of the system. For example, array 42a is shown to be associated with the first output bit, 42b with the second output bit, and so forth. Each array is composed of a plurality of elements 46 which are arranged in rows and columns within the array. The elements are light controlling devices, of a known type, which can be made either transparent or opaque upon the application of electrical signals. For example, these light controlling devices might be electro-optic devices that rotate the polarization of the light. This could be used together with a polarizer to produce an element that is either transparent or opaque depending on applied voltage. Each row in a given array corresponds to an input combination which causes the output bit associated with that array to be a logical "1". All rows of all arrays are filled with the necessary patterns such that each input combination which produces a logical "1" at the output is represented. Obviously, the arrays may have different numbers of rows because different numbers of input combinations produce logical "ones" for the various output bits depending upon the desired mathematical function being implemented by the truth tables. If it is desirable that all arrays be of the same length, several short arrays may be stacked vertically or patterns within a particular array may be wholly or partially repeated to extend the length of the array. The method adopted in the organization and layout of the page composer array must be reflected in the layout of the detector array as will be discussed below. The number of columns in each array corresponds to the number of bits in the input information to be processed. For example, the page composer illustrated in FIG. 2 has six columns in each array which is the number necessary for a truth table representing the binary addition of two two-bit binary signals including carry-in and carry-out bits. It should be noted that the truth table arrays illustrated are really only partial truth tables in that they do not include the various input combinations which form logical "zeros" at the output. Since the "0" combinations are not included, a considerable saving in storage space in the recording medium is achieved.

Figure 3:
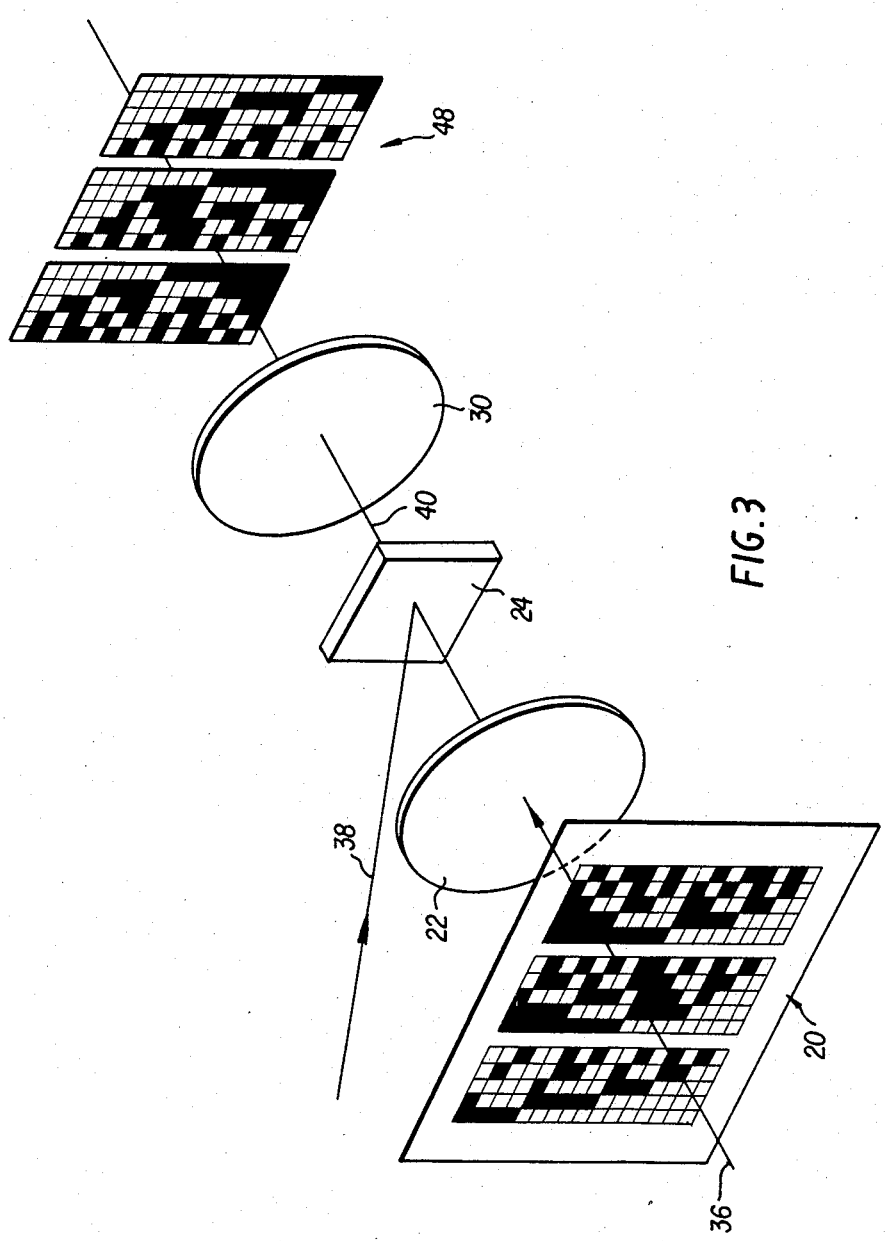
FIG. 3 is a schematic representation of the recording process using the optical system shown in FIG. 1.

FIG. 3 shows a schematic representation of the recording process utilizing the system of FIG. 1. After the page composer has been prepared as described above, the phase shifter 26, in the path of the reference beam 38, is set to an arbitrary but known phase value and the attenuator 14 in the object beam path 36 is set to a known value. The laser 10 is then turned on for a controlled length of time to record a hologram of the object beam passing through the page composer in the holographic recording medium 24. The hologram represents the interference pattern of the object coherent light beam and the reference coherent light beam. Reference numeral 48 in FIG. 3 represents the optical pattern viewable at the surface of the detector array 32 during the recording process.

After the hologram has been recorded the recording medium is subject to whatever fixing process, if any, is necessary to prevent degradation of the hologram during further exposure to light. In the case of electro-optic crystals, the fixing process is to heat the crystal to a temperature and for a duration sufficient to produce permanent migration of ions in the crystal.

Figure 4:
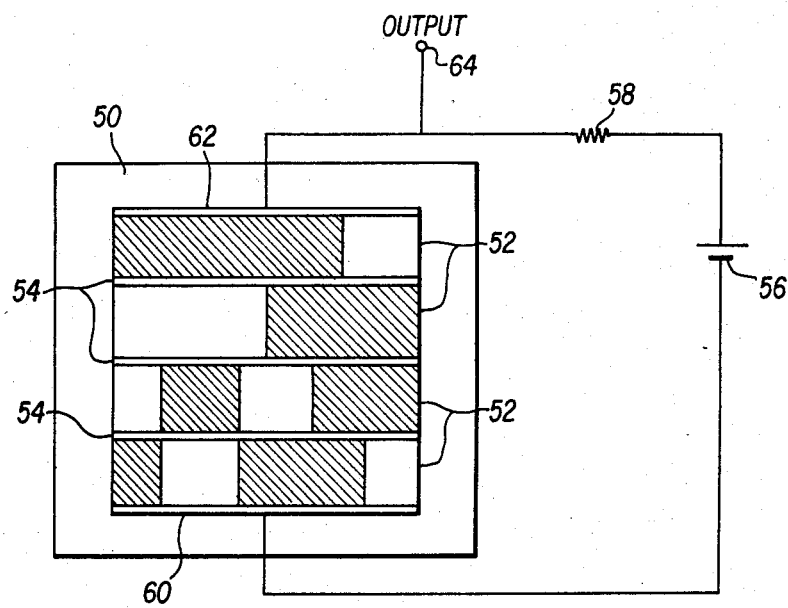
FIG. 4 is an example of the construction of a detector array to be used with the embodiment of the subject invention shown in FIG. 1.

The detector 32 operates to convert light incident upon its surface into electrical signals. The detector includes a plurality of detector arrays such that one array is associated with each bit of the output of the processer. In FIG. 4, detector array 50 is illustrated. The detector array 50 includes a plurality of rows of photoconductive material 52 which are arranged adjacent to each other in a column. Each row is separated from the adjacent row by means of a metal strip 54. The number of rows of photoconductive material in each detector array is equal to the number of rows in the truth table for the particular output bit being detected. A metal strip 60 runs along the lower edge of the array and an upper metal strip 62 runs along the upper edge of the array. A potential is applied across metal strips 60 and 62 by means of a potential source 56 in series with a resistor 58. Current flows through the detector array as long as at least some portion of each row is illuminated. The illuminated portions of adjacent rows need not overlap each other due to the presence of the metal strips 54. If any entire row is dark, however, there will be no conductive path through that row and no current will flow through the array. The current flow through the array is detected at an output 64 where the lack of current flow produces an output of logical "1" and the presence of current produces a logical "0".

Figure 5:
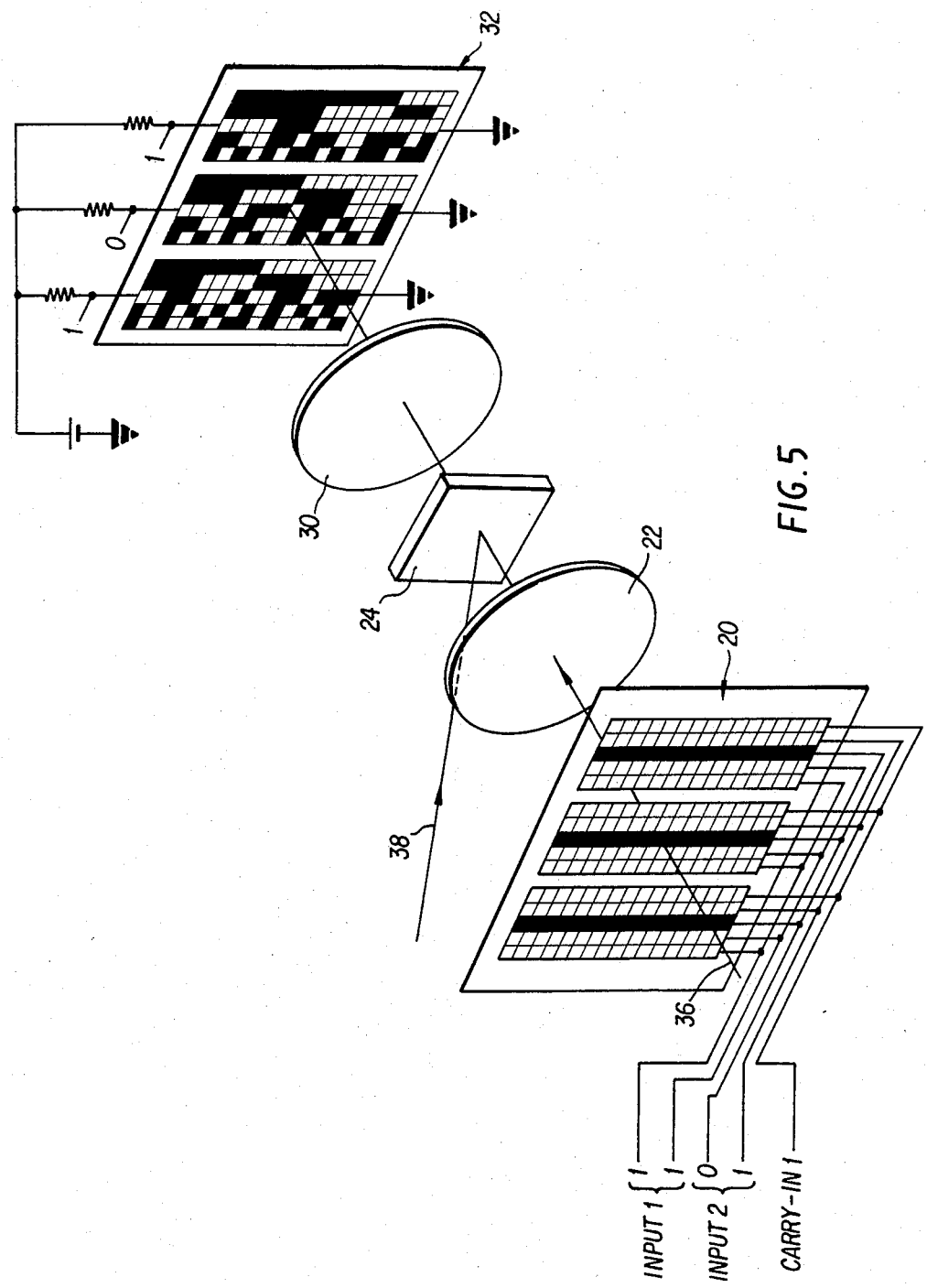
FIG. 5 is a schematic diagram illustrating the processing of input data using the optical system of FIG. 1.

FIG. 5 illustrates the processing mode of the system of FIG. 1. The phase shifter 2 is set to a value 180° different from the value used during the recording of the hologram on the recording medium 24. The recorded hologram is reconstructed onto the surface of the detector 32 by means of the phase shifted reference beam passing through the recording medium 24 and the lens 30. The page composer 20 is adjusted such that the transmission characteristics of each element in each column of each array are controlled by a particular bit of the input signals. Thus, each input bit of the input signals are represented by a column in each array of the page composer. The elements are illustrated as being transparent for a logical "1" bit and opaque for a logical "0" bit. The object beam 36 passing through the page composer, the lens 22, the recording medium 24, and the lens 30, is imaged on the surface of the detector array 32. The intensity of the image spots is adjusted to be equal to the intensity of the reconstructed hologram spots by means of the attenuator 14 such that the reconstruction of the hologram coherently adds and subtracts with the image wavefront. The combination of the image spots and the reconstructed spots incident upon the surface of the detector 32 produces a bit by bit EXCLUSIVE OR function at the detector between the input data pattern and each of the rows of the page composer arrays holographically stored in the recording medium 24. This may be understood as follows: If neither the image nor the reconstruction contribute light to a position on the detector array, then that position will be dark. If either the image or the reconstruction, but not both, contribute light, then the position will be illuminated. If both the image and the reconstruction contribute light, the wavefronts from each will be equal in amplitude, due to the adjustment of the attenuator 14, and opposite in phase, due to the adjustment of the phase shifter 26. Thus, there will be cancellation and the position will be dark. If the pattern of the inputs exactly matches a pattern stored in a row in one of the arrays of the hologram, then the entire row at the detector 32 will be dark. The presence of an entire dark row at the detector indicates that the input pattern has matched one of the stored truth table entrys for the output bit associated with that array. Thus, an optical EXCLUSIVE OR process is performed at the surface of the detector array between the reconstruction of the hologram and the optical input data passing through the holographic medium. FIG. 5 illustrates the addition of binary 11 to 01 with an input carry of 1 to produce the result 0101. It should be noted that a logical OR operation could be performed between the input and stored data wave if the phase shifter 26 is set to the phase shift utilized during the recording of the recording medium 24 rather than the 180° phase shift described above.

It should be noted that the EXCLUSIVE OR truth table look-up system described above is essentially an associative or content-addressable memory. This associative function takes place on a bit by bit basis rather than depending on the correlation of two entire spacially-distributed wavefronts as illustrated in prior art devices. A key word is provided to the input of the system and memory locations which contain that key word are identified by entirely null rows in the detector array. The same system would also have the capability of functioning as a location addressable memory if provisions for such were made in the design of the detector array.

The above described system may be modified by the incorporation of electronic feedback between the detector 32 and the phase shifter 26 and attenuator 14 to maintain the precise phase and amplitude relationships required for proper operation.

The above described system could be further extended by recording a plurality of holograms separated by position and angle on the holographic recording medium. Each hologram could contain truth tables for a different numerical operation to be performed. In this way, several functions could be performed sequentially on the same input data by addressing different holograms to be reconstructed.

In a second preferred embodiment of the present invention, numerical processing is performed using an optical NAND-OR-OR form of operation. As with the previously discussed EXCLUSIVE OR embodiment, the principle of operation of the NAND-OR-OR embodiment is to record patterns from the truth tables in holographic form and then to compare system inputs with the stored patterns; a match being indicated by a logical "1" valued output bit. Unlike the EXCLUSIVE OR operation where the truth table patterns are stored simultaneously, in the NAND-OR-OR implementation the truth table patterns are stored one at a time. FIG. 6 illustrates a system utilized to record the truth table information in holographic form.

In FIG. 6, a laser 100 produces a coherent beam of light 122 which is separated by a beam splitter 102 into an object beam 124 and a reference beam 126. The object beam 124 is reflected by a mirror 104 and passes through a pair of cylindrical lenses 110, 112, and a phase shifting line composer 118 which spatially phase modulates the object beam. After exiting the phase shifting line composer, the light beam is imaged onto a holographic storage medium 116 by means of a Fourier transforming lens 114. The reference beam 126 passes through a deflector 106 where it is deflected to a number of discrete positions such as 126a and 128b shown in FIG. 6. The deflected beams are focused by lenses 108 and 114 onto the surface of the holographic recording medium 116. By stepping the deflected reference beam sequentially through its various possible positions during the recording process, one truth table pattern may be recorded for each reference beam location.

Figure 7B:
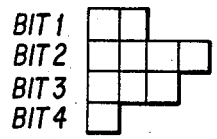

The phase shifting line composer 118 is a one dimensional array of elements 130 which are each capable of individually shifting the phase of the light passing through them in response to an applied electrical signal such as from an electronic preprocessor 120. Typically, the phase shifting elements would be electro-optic crystals with electrodes. Application of a voltage to these devices causes the index of refraction to change, thus shifting the phase of the light passing through the device. The electronic preprocessor might be an electronic digital-to-analog converter controlled by an electronic microprocessor. If there are N inputs to the system, there must be N+1 elements in the phase shifting line composer. The phase shift imposed by each element on the object beam is determined by the electronic preprocessor 120 for each truth table pattern to be recorded. The phase shift imposed by each element on the object beam is determined in the following way. One element of the line composer is set to a fixed phase for all recordings. This is the reference bit and its phase is arbitrarily designated as being zero degrees phase with all other phases being measured with the respect to it. The preprocessor 120 determines the number of input data bits which are logical "ones" for the truth table pattern to be stored. If there are M logical "ones" present in the input data bits, the elements in the line composer corresponding to the positions of these "ones" are set to phase shifts of:

$$(1 \times 360°)/(M+1), (2 \times 360°)/(M+1), \ldots,$$
$$(M \times 360°)/(M+1)$$

respectively. The phase shifts for all other elements, corresponding to the positions of logical "zeros" in the input data bits, are set equal to zero degrees. If an input data word containing all "zeros" is to be stored, all elements of the line composer are set to zero degrees phase shift and the reference bit is not recorded. The hologram of the pattern of phase shifts is recorded on the holographic recording medium 116. The deflector 106 moves the reference beam to its next sequential position and another truth table combination is set in the phase shifting line composer by means of the preprocessor 120. As in the previously described EXCLUSIVE OR implementation, all combinations of the input bits which produce a logical "1" in an output bit are recorded. However, in the NAND-OR-OR implementation, each input combination which produces a logical "1" in an output is recorded as a separate hologram. All holograms for a given output bit are recorded in a linear sequence of reference beam positions. FIG. 7 illustrates several ways in which the reference beam for individual holograms may be organized. In FIG. 7a, the sets of holograms for different output bits are recorded along one line with blank positions being left between various sets. FIG. 7b illustrates an organization where the holograms for each output bit are recorded in separate rows and the rows are arranged to form a two dimensional array by using a deflector 106 which can move the reference beam in orthogonal directions. As in the previously discussed EXCLUSIVE OR implementation, the organization of information on the holographic recording medium must correspond to the positions of detector elements in the detector used during processing. Also, as in the previously discussed EXCLUSIVE OR implementation, after all the holograms are recorded the recording medium should undergo any required fixing process.

Figure 8:
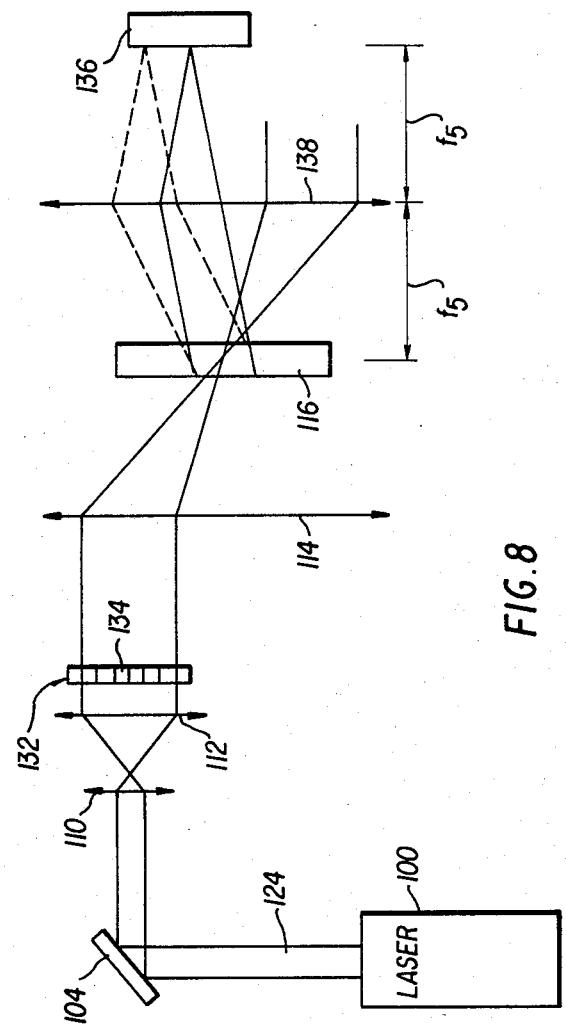
FIG. 8 shows an optical system used for processing input data under the method of the second preferred embodiment.
Figure 9A:
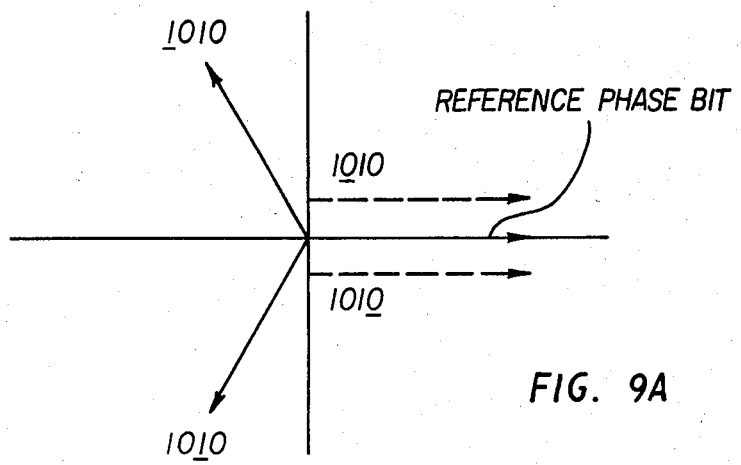
FIGS. 9a through 9d are phasor diagrams showing the relationship of the wavefronts for the second preferred embodiment.
Figure 9B:
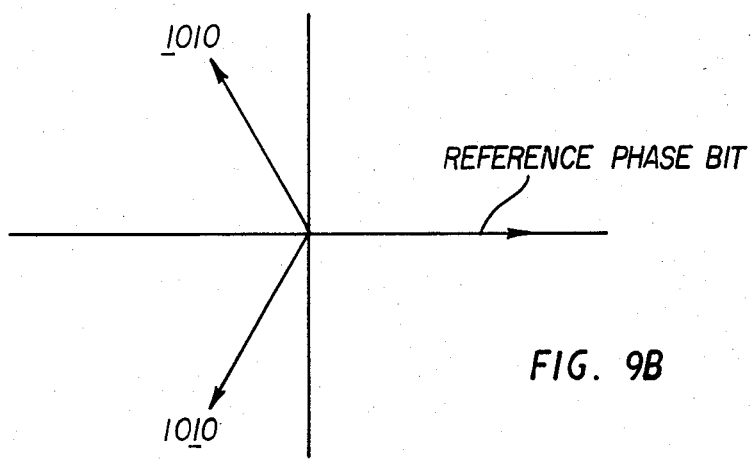
Figure 9C:
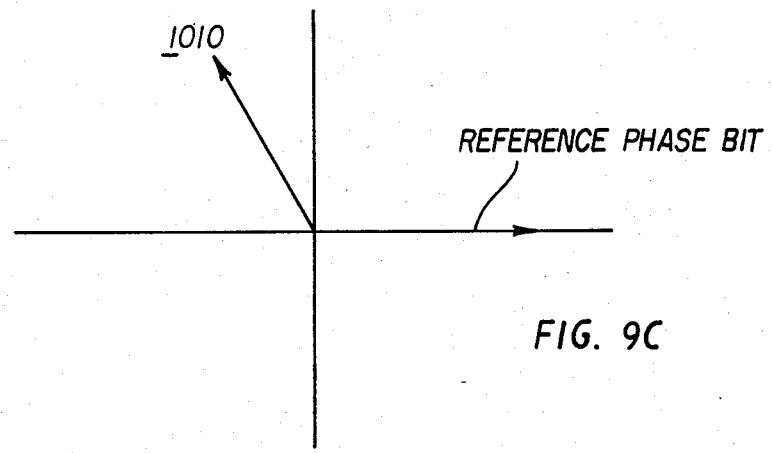
Figure 9D:
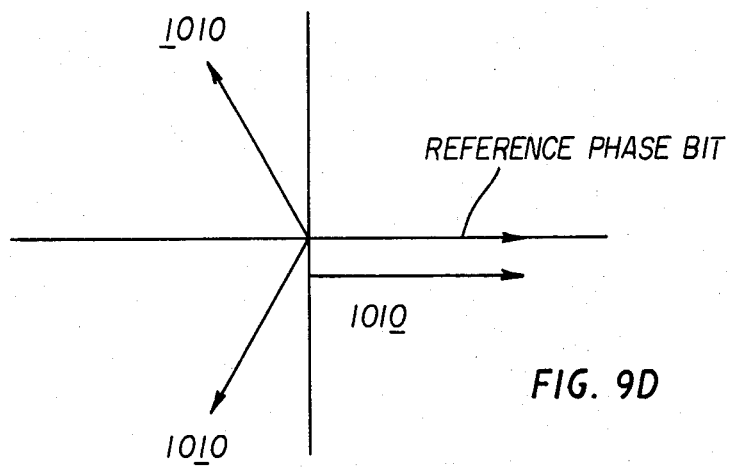
Figure 10:
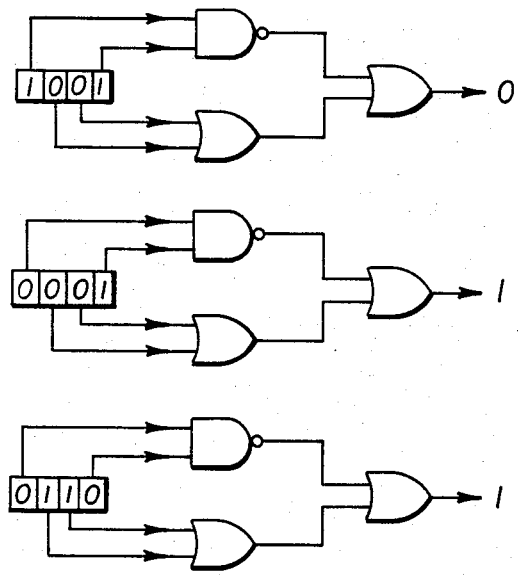
FIG. 10 illustrates the NAND-OR-OR concept of the second preferred embodiment.

FIG. 8 shows an optical system utilized for processing. Components which are common with those used in the recording system of FIG. 6 have been numbered correspondingly. In FIG. 8, the phase shifting line composer has been replaced by an amplitude type line composer 132 which acts to spatially amplitude modulate the object beam. The amplitude line composer is one dimensional array of light controlling elements 134 which have the same size, shape, and are in the same position as the phase shifting elements in the phase shifting line composer 118. The elements in the amplitude type line composer are controlled directly by the bits in the input signal such that a logical "1" bit produces a transparent element and a logical "0" bit produces an opaque element. The element in the position of the reference bit remains transparent at all times. Coherent light rays from the object beam passing through the line composer are focused by the lens 114 onto the holographic recording medium 116 from which they travel to the detector 136 after being focused by a lens 138. Light rays passing through each transparent element in the line composer produce reconstructions of the reference beam at detector positions which are images of the reference beam locations used during recording. If the pattern of inputs matches one of the stored patterns, the wavefronts reaching the corresponding detector position will add coherently and cancel to produce a null. The phases associated with each of the four bits and the reference bit are shown in FIG. 9a. The broken lines in FIG. 9a indicate logical "zeros" in the input data. If the pattern of inputs has "1's" with the correct phases and "zeros" absent, then cancellation occurs producing a null as shown in FIG. 9b. This is due to the phases of the "1's" being equally spaced around a unit circle as seen in FIG. 9b. If the input differs from a stored pattern by not having a "1" where it should be, then one of the wavefronts needed for cancellation will be missing and the detector position will be illuminated as shown in FIG. 9c. Similarly, if the input differs by having a "1" where it should not be, then an extra wavefront at zero degrees phase will be present and cancellation can not occur as shown in FIG. 9d. Only if the input exactly matches the stored pattern will there be a null at the detector position. This corresponds to performing a NAND operation among all input bits which are "ones" in the stored pattern, performing an OR operation among all input bits that are "zeros" in the stored pattern, and OR-ing the two results together as shown in FIG. 10. The input signal must contain "ones" in all bit positions upon which the NAND operation is performed and "zeros" in all the bit positions which are subject to the OR operation for the output to be a "zero". Therefore, the output of the final OR operation will be "zero" only if the input signal contains "ones" and "zeros" in exactly the same positions as the stored data word. Thus, the name NAND-OR-OR is obtained for this type of processing.

Figure 11:
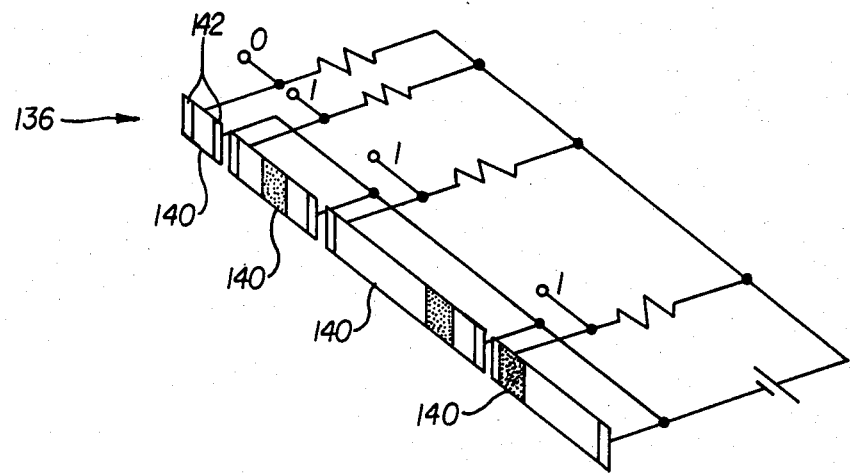
FIG. 11 schematically illustrates an example of a detector array utilized with the second preferred embodiment of the subject invention.
Figure 12:
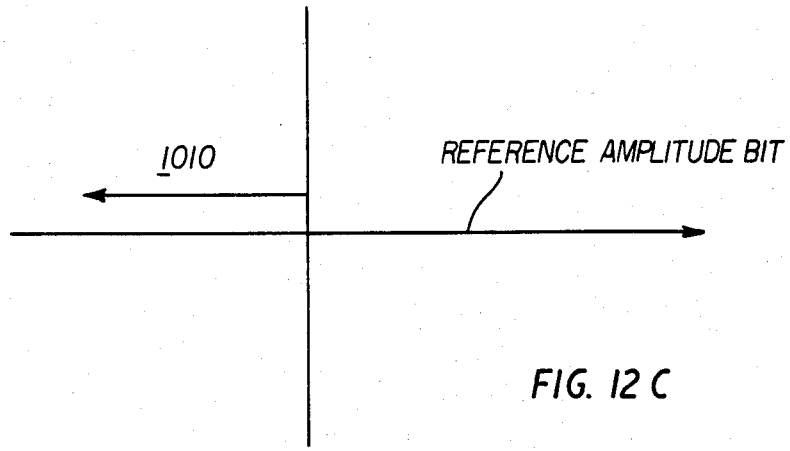
Figure 12:
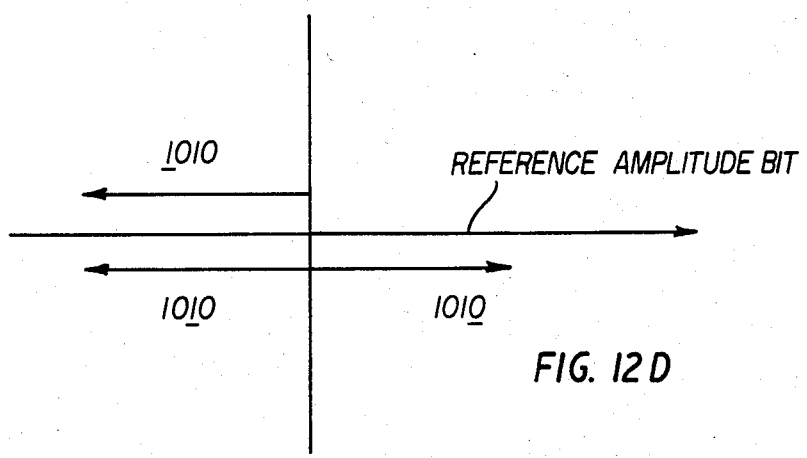

An example of a detector array usable with NAND-OR-OR processing is illustrated in FIG. 11. The detector array consists of a plurality of photoconductive strips 140 which are of various lengths. One strip is associated with each set of reference beam positions utilized for recording patterns for a particular output bit. Thus the length of each photoconductive strip corresponds to the number of hologram patterns needed for each output bit. An electrical potential is applied between the ends of the strips using metal contacts 142. If a photoconductive strip is illuminated along its entire length, current will flow. However, if a null in the illumination occurs, indicating that the input matches one of the stored patterns, the circuit is broken and current can not flow. The lack of current flow is used to produce an electrical output of logical "1" for the associated bit. The detector array of FIG. 11 corresponds to the arrangement of truth table holograms shown in FIG. 7b. The detector array could be organized into a two dimensional array of photoconductive strips to correspond to the arrangement of stored patterns shown in FIG. 7b.

Figure 12A:
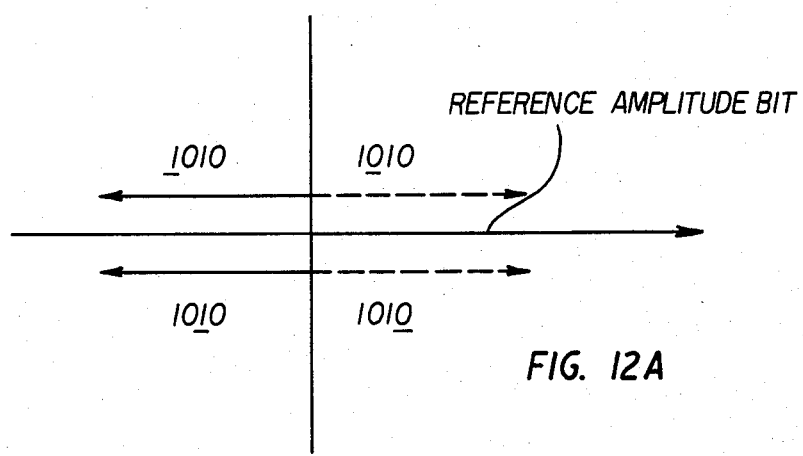
FIGS. 12a through 12d are phasor diagrams showing phase and amplitude relationships of wavefronts for an alternative version of the second preferred embodiment of the subject invention.
Figure 12B:
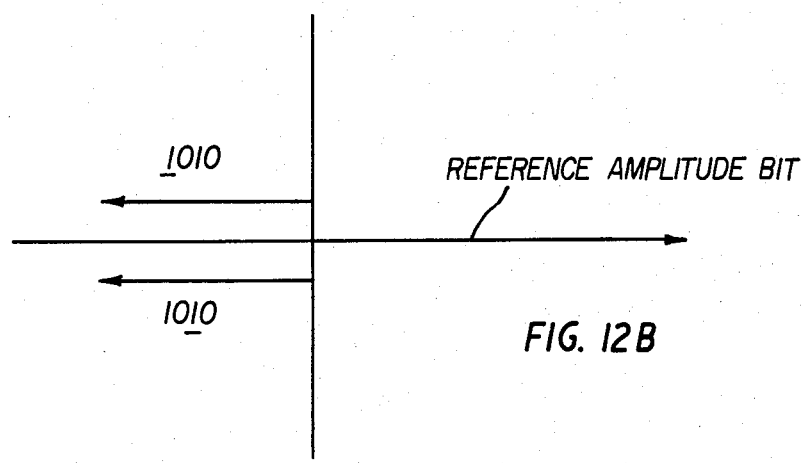

A variation of the NAND-OR-OR form of processing will now be described which utilizes the interference of two collinear phases having a range of amplitudes. In this variation, the holographic information is stored by the system of FIG. 6 with the elements of the phase shifting line composer 118 set for 180° phase shift for all positions corresponding to logical "ones" in the truth table pattern to be stored. All other elements in the phase shifting line composer, including the reference bit, are set for zero degrees phase shift. Alternately, the pattern could be stored utilizing an amplitude type line composer in place of the phase shifting line composer by recording the "ones" and "zeros" of the truth table pattern separately with the phase of the reference beam 126 shifted 180° during the recording of the "ones". In either case, the wavefront reconstruction due to the reference bit must have M times greater amplitude than that of the other wavefronts, where M is the number of "ones" in the pattern to be stored. The phases associated with each of the four bits and the reference bit are shown in FIG. 12a. FIG. 12b which illustrates the situation where a match between the input data and the reconstruction results in a null. The broken lines in FIG. 12a indicate logical "zeros" in the input data. The increased amplitude for the reference bit may be accomplished by recording it with the reference beam for a proportionately longer period of time than for the other bits. This requires the addition of shutters (not shown) to the system of FIG. 6 so that the reference bit may be controlled independently from the other bits. FIG. 12c illustrates the situation where the input differs from the stored pattern by not having a "1" where it should be which results in the illumination of a detector position. In FIG. 12d, the input differs from the stored pattern by having a "1" where it should not be, thus, again producing illumination at a detector position.

Figure 13A:
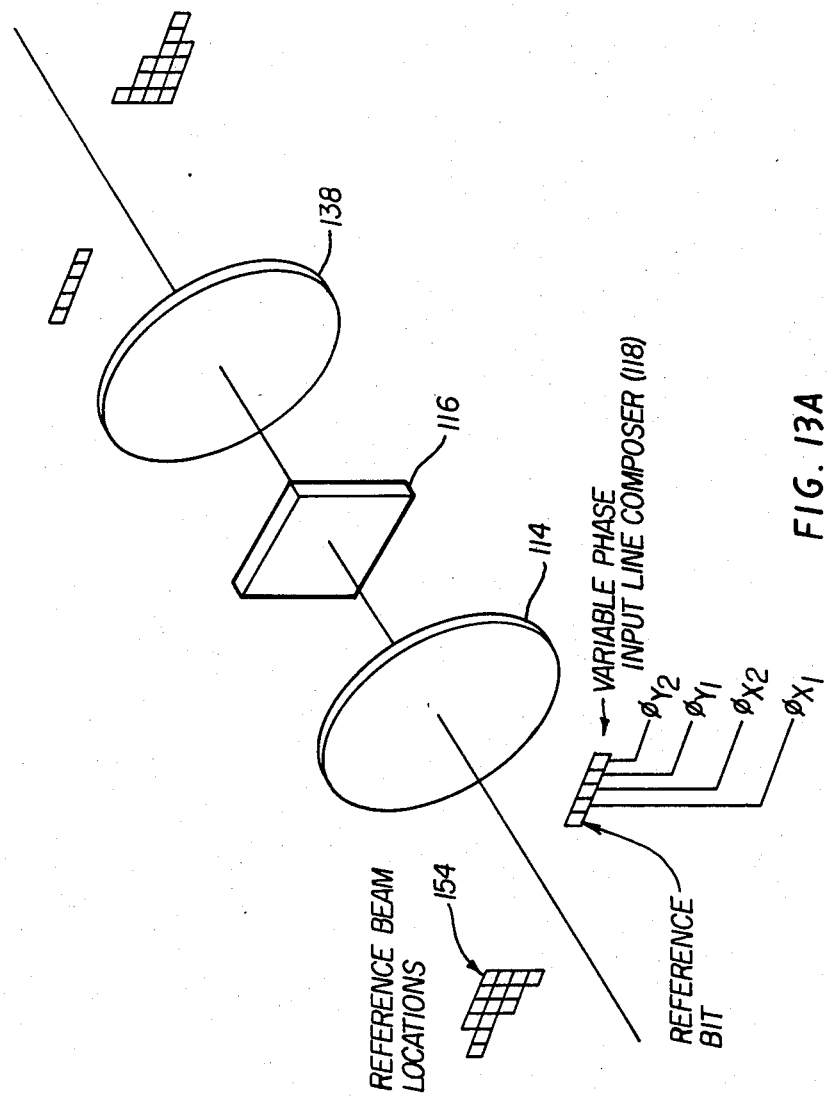

FIG. 13a is a schematic representation of the recording process for either variation of the NAND-OR-OR method. The two dimensional array 154 at the left of the phase shifting line composer 118 indicates a series of locations which the reference beam sequentially steps through during the recording process. FIG. 13b schematically illustrates the processing method for the optical multiplication of two two-bit numbers (10 and 10) to produce the result 0100. As with the EXCLUSIVE OR implementation, the NAND-OR-OR implementation functions primarily as a content-addressable memory.

Two methods for extending the NAND-OR-OR based processing to operate on a plurality of input words to produce a corresponding plurality of outputs simulataneously will now be discussed. The first method makes use of the angular selectivity of the volume holographic storage medium. The second method uses the lack of angular selectivity in directions perpendicular to the plane of the recording beams. Both methods require that the deflector 106 of FIG. 6 be capable of deflecting the reference beam in both transverse directions and that there be a single row of reference beam positions per set of output bits organized as shown in FIG. 7a.

Figure 14A:
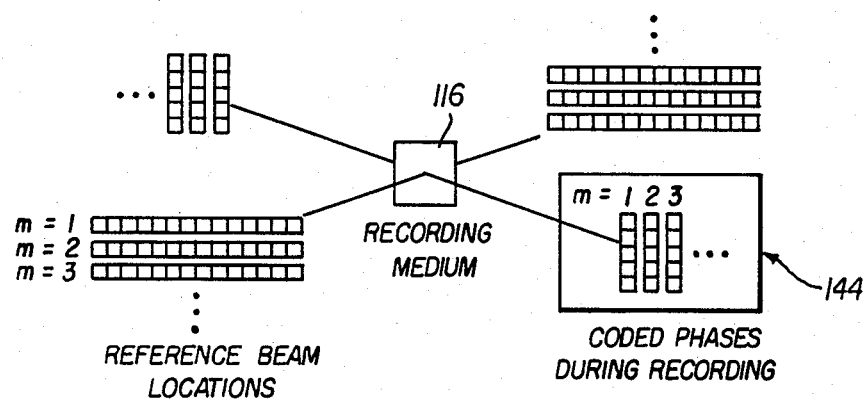
FIG. 14a illustrates the recording of holograms under a first method of extending the second preferred embodiment.
Figure 14B:
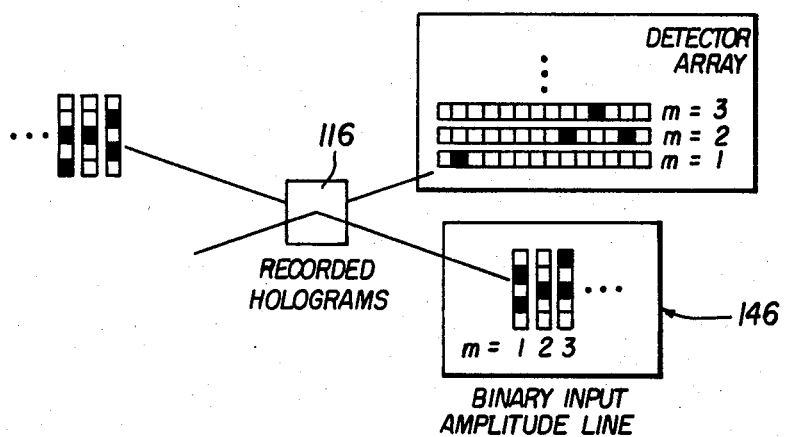

The first method involves the replacement of the single phase shifting line composer 118 of FIG. 6 with a plurality of perpendicularly oriented phase shifting line composers 144 as illustrated in FIG. 14a which is a schematic representation of the recording process. Each phase shifting line composer is angularly separated from the adjacent line composers such that its hologram may be reconstructed separately from those of the other line composers. The Fourier transform lenses have been omitted from FIG. 14 for simplicity. The reference beam positions for this method are in the form of a two dimensional array. During recording, the phase shifting line composer labelled (M=1) is illuminated while the reference beam steps through the row of positions labelled (M=1). This is repeated for all other values of M where M is the number of mathematical functions to be implemented. The truth table patterns stored for each phase shifting line composer may be different, thus implementing a different numerical function for each line composer. FIG. 14b schematically illustrates data processing with this method. In FIG. 14b, the single amplitude type line composer 132 of FIG. 8 has been replaced by a plurality of perpendicularly oriented amplitude type line composers 146. There are as many amplitude type line composers as there were phase shifting line composers during the recording process. The output associated with the input signals present at a particular amplitude type line composer occurs at the image position of the corresponding reference beam row. As with the previously discussed embodiments, the detector array must be organized to match the organization of data stored in the holographic storage medium. During the processing stage, different pairs of input words may be input into each of the amplitude type line composers. Each output appearing at the detector array will depend only on the corresponding inputs due to the angular selectivity of the recording medium. Since separate holograms are recorded for each input-output set, the functions realized by each set may be different if desired. A variation of this system could utilize one of the page composers to record a different function for each row of reference beam locations. This system could then realize several different functions of the same input simultaneously.

Figure 15A:
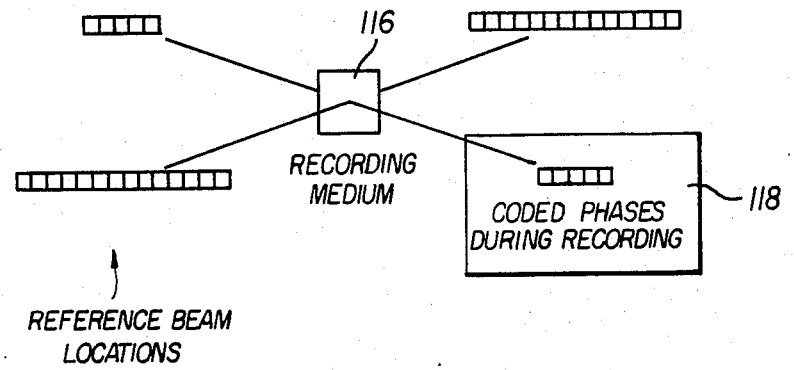
FIG. 15a illustrates the recording of a single set of holograms under a second method of extension of the second preferred embodiment.
Figure 15B:
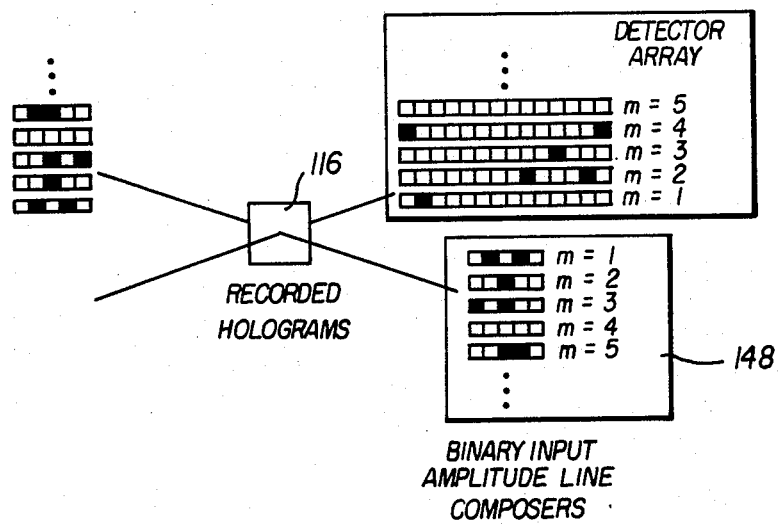

The second extension method utilizes a recording process exactly as illustrated for the second preferred embodiment shown in FIG. 6. In this recording process, all the reference beam locations are in a single row. FIG. 15a schematically illustrates the recording process. Again, the Fourier transforming lenses have been omitted for simplicity. For the processing operation, the single amplitude type line composer 132 of FIG. 8 has been replaced by a plurality of amplitude type line composers 148 as illustrated schematically in FIG. 15b. The light rays passing through each of the plurality of amplitude type line composers 148 produces an independent output reconstruction of the single set of recorded holograms at the detector array, with the positional correspondence between input and output as illustrated in FIG. 15b. As previously discussed, the detector array must be organized to match the organization of the data stored in the storage medium and the data organization of the amplitude type line composer. Since only a single set of holograms is recorded, the functional relationship between each input-output pair is the same, but different input data may be presented to each amplitude type line composer. Thus, a plurality of different pairs of inputs may be processed simultaneously.

In either the EXCLUSIVE OR embodiments or the various NAND-OR-OR embodiments of the numerical processor of the present invention discussed above, the maximum required memory space has been reduced by recording only portions of the truth table data which produce logical "ones" in the system output. Further reduction in the maximum required memory space is possible in most cases. For example, suppose the two input combinations 1110 and 1010 produce a value of "1" for some output bit. For biphase multi-amplitude NAND-OR-OR processing, instead of recording a hologram for each combination, a single hologram could be recorded treating the second bit from the left as a "don't care" bit. The single hologram would be recorded with the first and third bits at 180° phase and the fourth bit recorded at 0° phase. The reference bit would also be recorded at 0° phase with an amplitude of two units. This hologram would produce a null in the output for an input of either 1110 or 1010. This form of reduction resembles the use of a Karnaugh map in conventional logic design and can be tailored on a case by case basis for the truth tables to be implemented.

In all of the various embodiments of the numerical processor of the present invention discussed above, it should be noted that the highly-precise multiple holographic recording sequence occurs only once for a processor during its fabrication. After it is constructed, it is then prepared to do a large number of calculations over its lifetime. This may be analogized to integrated circuits, which require intricate and highly accurate fabrication processes but which then function simply and reliably in routine environments once constructed.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A numerical optical processor, comprising:
   a holographic storage medium, said medium storing at least one hologram representing relationships between a plurality of digital inputs and outputs in the form of a plurality of binary truth tables, said at least one hologram being formed by an interference pattern between a first object beam of coherent light coded with said truth table information and a first reference beam of coherent light, said storage medium acting to transmit at least a portion of light signals incident thereon, said storage medium operating as a content addressable memory;
   input means for receiving at least one digital input word and for coding a second object beam of coherent light with said at least one input word, said coded second object beam being incident upon said storage medium; and
   detector means for receiving light signals passing through said storage medium and for converting said light signals into at least one electronic output word in digital form;
   whereby said optical processor performs a numerical operation upon said at least one digital input word.

2. A numerical optical processor as recited in claim 1, wherein:
   said holographic storage medium stores said plurality of binary truth tables in the form of a single hologram;
   each of said plurality of binary truth tables stored in said holographic storage medium on a single hologram represents all the possible combinations of bits of said at least one digital input word which produce a logical "one" at a particular bit of said output word;
   said first object beam is coded by spatially amplitude modulating said beam such that the truth table information appears as light and dark portions of said coded beam;
   a second reference beam of coherent light is passed through said storage medium, said second reference beam being phase shifted 180° with respect to said first reference beam, said second reference beam producing a reconstruction of the holographic information stored in said medium at said detector means;

said input means codes said second object beam by spatially amplitude modulating said beam such that said at least one digital input word appears as light and dark portions of said coded beam; and said detector means receives both the reconstructed holographic information and portions of the coded second object beam passing through said storage medium, the reconstructed holographic information and said portions of the coded second beam being vectorally added together optically at said detector.

3. A numerical optical processor as recited in claim 2, which further comprises:

a recording page composer, said recording page composer operating to spatially amplitude modulate said first object beam with said truth table information;

wherein said recording page composer includes a plurality of light controlling elements arranged in a plurality of two dimensional arrays of rows and columns of elements, each element having a light transmission characteristic which is electrically controllable between one of a transparent state and an opaque state, each array of elements representing a single truth table, each row of elements in each array corresponding to a particular combination of bits of said at least one digital input word which produces a logical "one" at said particular bit of said output word.

4. A numerical optical processor as recited in claim 2, wherein said input means comprises:

a processing page composer, said processing page composer operating to spatially amplitude modulate said second object beam with said at least one digital input word;

wherein said processing page composer includes a plurality of light controlling elements arranged in a plurality of two dimensional arrays of rows and columns of elements, each element having a light transmission characteristic which is electrically controllable between one of a transparent state and an opaque state, each array corresponding to a particular truth table stored in said storage medium, each element in a particular column of each array being controlled simultaneously by a particular bit of said at least one digital input word such that all the bits of said at least one digital input word are represented by individual columns of elements in each array.

5. A numerical optical processor as recited in claim 2, wherein said detector means comprises:

a plurality of detector arrays, each of said detector arrays corresponding to a particular bit of said output word.

6. A numerical optical processor as recited in claim 5, wherein each of said plurality of detector arrays comprises:

a plurality of detector elements arranged in a one dimensional array, each of said detector elements forming a row in a column of elements, each row of said column representing a row of said truth table stored holographically in said storage medium;

wherein each element includes a strip of photoconductive material having a metal contact strip along each longitudinal edge, said metal contact strips between adjacent rows of elemenets in said column being electrically connected together;

wherein said column acts to conduct an electric current between the uppermost metal contact of the top row of said column and the lowermost metal contact of the bottom row of said column when at least a portion of each row of elements is illuminated, the presence of an electric current representing a logical "zero".

7. A numerical optical processor as recited in claim 2, wherein:

said holographic storage medium stores a second plurality of binary truth tables representing relationships between a second plurality of inputs and outputs in the form of a second single hologram, said second single hologram being formed by an interference pattern between said first object beam coded with said second truth table information and said first reference beam, said first reference beam being deflected such that said second single hologram is stored at a separate location on said storage medium from said single hologram.

8. A numerical optical processor as recited in claim 1, wherein:

said holographic storage medium stores said plurality of binary truth tables in the form of a plurality of holograms, said first reference beam being deflected to a plurality of different positions such that each of said plurality of holograms is stored at a separate location on said holographic storage medium, each of said holograms representing a particular combination of bits of said at least one digital input word which produces a logical "one" at a particular bit of said at least one electronic output word, the holograms which are associated with a particular bit of said output word being grouped together in a pattern;

said first object beam is coded by spatially phase modulating said first object beam with said truth table information such that said truth table information appears as a plurality of phase shifted portions of said first object beam, each bit of said truth table information being represented by a particular phase shifted portion of said beam; and said input means codes said second object beam with said at least one digital input word such that said at least one digital input word appears as light and dark portions of said beam.

9. A numerical optical processor as recited in claim 8, which further comprises:

a phase shifting line composer, said line composer spatially phase modulating said first object beam with said truth table information;

wherein said phase shifting line composer includes a plurality of light controlling elements arranged in a one dimensional array, each element acting to alter the phase of light passing therethrough, each bit position of said truth table corresponding to a particular element in said array;

wherein a first element of said array is maintained at a constant 0° phase shift, the portion of said first object beam passing through said first element being a recording reference beam; and wherein said elements of said array corresponding to bit positions of said truth table which contain logical "zeros" are set to 0° phase shift.

10. A numerical optical processor as recited in claim 9, wherein:

said elements of said phase shifting line composer corresponding to bit positions of said truth table which contain logical "ones" are set to respective phase shifts of $(1\times360°)/(M+1)$, $(2\times360°)/(M+1)$, ..., $(M\times360°)/(M+1)$ where M is the number of bit positions containing logical "ones".

11. A numerical optical processor as recited in claim 9, wherein:
said elements of said phase shifting line composer corresponding to bit positions of said truth table which contain logical "ones" are each set to a phase shift of 180°.

12. A numerical optical processor as recited in claim 8, wherein said input means comprises:
an amplitude type line composer, said line composer spatially amplitude modulating said second object beam with said at least one digital input word;
wherein said line composer includes a plurality of light controlling elements arranged in a one dimensional array, each element having a light transmission characteristic which is electrically controllable between one of a transparent state and an opaque state, each bit of said at least one input digital word corresponding to an element of said array such that a logical "one" bit produces a transparent element and a logical "zero" bit produces an opaque element; and
wherein a first element of said array is maintained in a transparent state, the portion of said second object beam passing through said first element being a processing reference beam.

13. A numerical optical processor as recited in claim 8, wherein said detector means comprises:
a plurality of detector elements, each of said detector elements corresponding to a particular bit of said output word.

14. A numerical optical processor as recited in claim 8, wherein:
said first reference beam is deflected to a plurality of positions along a single row such that each of said plurality of holograms is stored at a separate location along said single row in said storage medium.

15. A numerical optical processor as recited in claim 14, wherein said input means comprises:
a plurality of amplitude type line composers, each of said line composers spatially amplitude modulating said second object beam, each line composer forming a row in a column of line composers;
wherein each of said line composers includes a plurality of light controlling elements arranged in a one dimensional array, each element having a light transmission characteristic which is electrically controllable between one of a transparent state and an opaque state;
wherein said at least one digital input word includes several input words, each of said plurality of line composers receiving at least one of said several input words, each bit of said at least one of said several input words corresponding to an element of one of said line composers such that a logical "one" bit produces a transparent element and a logical "zero" bit produces an opaque element; and
wherein a first element of each line composer is maintained in a transparent state, the portion of said object beam passing through each of said first elements being a processing reference beam for that line composer.

16. A numerical optical processor as recited in claim 15, wherein said detector means comprises:
a plurality of detector arrays, each array forming a row in a column of detector arrays, each array corresponding to a particular line composer in said input means, each array detecting a separate output word, whereby said processor simultaneously performs a numerical operation on said several input words; and
wherein each of said arrays includes a plurality of detector elements, each element corresponding to a particular bit of said output word detected by said array.

17. A numerical optical processor as recited in claim 1, wherein:
said at least one digital input word includes several input words and said at least one electronic output word includes several output words, said several input and output words being related by a plurality of functional relationships, each of said functions representing a relationship between at least one of said several input words and one of said several output words, said plurality of functions being represented by a plurality of binary truth tables;
said storage medium stores said plurality of binary truth tables in the form of a plurality of holograms, said first reference beam being deflected to a plurality of different positions in the form of a two dimensional array such that each of said plurality of holograms is stored at a separate location on said storage medium, each row of said array including a plurality of holograms representing one of said plurality of functions, each row corresponding to a particular output word, each of said holograms in a row representing a particular combination of bits of said at least one of said several input words which produces a logical "one" at a particular bit of said output word;
said first object beam is coded by spatially phase modulating said beam with said truth table information such that said truth table information appears as a plurality of phase shifted portions of said beam, each bit of said truth table information being represented by a particular phase shifted portion of said beam; and
said input means codes in said second object beam with said several input words such that said several input words appear as light and dark portions of said beam.

18. A numerical optical processor as recited in claim 17, which further comprises:
a plurality of phase shifting line composers, each of said plurality of line composers spatially phase modulating said first object beam with said truth table information corresponding to a particular functional relationship;
wherein each of said plurality of phase shifting line composers includes a plurality of photoconducting elements arranged in a one dimensional array, each element acting to alter the phase of light passing therethrough, each bit position of said truth table associated with said line composer corresponding to a particular element in said array;
wherein each of said plurality of line composers is perpendicularly oriented with respect to the rows of said reference beam positions;
wherein a first element in each line composer is maintained at a constant 0° phase shift, the portion of said first object beam passing through each of said first elements being a recording reference beam for that line composer; and wherein said elements of said line composers corresponding to bit positions of said truth tables which contain logical "zeros" are set to 0° phase shift.

19. A numerical optical processor as recited in claim 18, wherein said input means comprises:

a plurality of amplitude type line composers, each of said line composers spatially amplitude modulating said second object beam, each of said plurality of line composers being perpendicularly oriented with respect to the rows of said reference beam positions, the number of said plurality of amplitude type line composers being equal to the number of said plurality of phase shifting line composers;

wherein each of said amplitude type line composers includes a plurality of light controlling elements arranged in a one dimensional array, each element having a light transmission characteristic which is electrically controllable between one of a transparent state and an opaque state;

wherein each of said plurality of amplitude type line composers receives at least one of said several input words, each bit of said at least one of said several input words corresponding to an element of one of said line composers such that a logical "one" bit produces a transparent element and a logical "zero" bit produces an opaque element; and wherein a first element of each amplitude type line composer is maintained in a transparent state, the portion of said object beam passing through each of said first elements being a processing reference beam for that line composer.

20. A numerical optical processor as recited in claim 19, wherein said detector means comprises:

a plurality of detector arrays, each array forming a row in a column of detector arrays, each array corresponding to a particular line composer in said input means, each array detecting a separate one of said several output words, whereby said processor simultaneously performs several simultaneous numerical operations on said several input words; and wherein each of said arrays includes a plurality of detector elements, each element corresponding to a particular bit of said output word detected by said array.

21. A numerical optical processor as recited in claims 13, 16, or 20, wherein each of said plurality of detector elements comprises:

a photoconductive strip including a metal contact at each end, said strip conducting an electric current between said metal contacts when the entire length of said strip is illuminated, the presence of said current representing a logical "zero"; and wherein the length of said photoconductive strip is proportional to the number of stored holograms associated with the particular output bit detected by said element.

* * * * *